United States Patent
Benantar et al.

(10) Patent No.: US 7,788,710 B2
(45) Date of Patent: *Aug. 31, 2010

(54) ARCHITECTURE AND DESIGN FOR CENTRAL AUTHENTICATION AND AUTHORIZATION IN AN ON-DEMAND UTILITY ENVIRONMENT USING A SECURED GLOBAL HASHTABLE

(75) Inventors: Messaoud Benantar, Austin, TX (US); Yen-Fu Chen, Austin, TX (US); John W. Dunsmoir, Round Rock, TX (US); Randolph Michael Forlenza, Austin, TX (US); Wei Liu, Wexford, PA (US); Sandra Juni Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 12/147,716

(22) Filed: Jun. 27, 2008

(65) Prior Publication Data

US 2009/0037731 A1    Feb. 5, 2009

Related U.S. Application Data

(63) Continuation of application No. 10/850,398, filed on May 20, 2004, now Pat. No. 7,412,719.

(51) Int. Cl.
G06F 7/04 (2006.01)
(52) U.S. Cl. .......................... 726/6; 726/18
(58) Field of Classification Search .................. 705/67; 726/2, 6, 18; 713/156, 157, 158, 175
See application file for complete search history.

(56) References Cited

U.S. PATENT DOCUMENTS

| 5,793,868 | A | 8/1998 | Micali | 380/28 |
|---|---|---|---|---|
| 6,128,740 | A | 10/2000 | Curry et al. | 713/213 |
| 6,285,991 | B1 | 9/2001 | Powar | 705/200 |
| 6,321,333 | B1 | 11/2001 | Murray | 713/156 |
| 6,430,688 | B1 | 8/2002 | Kohl et al. | 713/156 |

(Continued)

OTHER PUBLICATIONS

IBM, "Living in an On Demand World," Oct. 2002.

(Continued)

*Primary Examiner*—Kimyen Vu
*Assistant Examiner*—Edward Zee
(74) *Attorney, Agent, or Firm*—Yee & Associates, P.C.; William H. Steinberg; Rudolf O. Siegesmund

(57) ABSTRACT

A Centralized Authentication & Authorization (CAA) system that prevents unauthorized access to client data using a secure global hashtable residing in the application server in a web services environment. CAA comprises a Service Request Filter (SRF) and Security Program (SP). The SRF intercepts service requests, extracts the service client's identifier from a digital certificate attached to the request, and stores the identifier in memory accessible to service providers. The client identifier is secured by the SP using a key unique to the client identifier. When the web services manager requests the client identifier, the web services manager must present the key to the SP in order to access the client identifier. Thus, the present invention prevents a malicious user from attempting to obtain sensitive data within the application server once the malicious user has gained access past the firewall.

2 Claims, 3 Drawing Sheets

U.S. PATENT DOCUMENTS

| | | |
|---|---|---|
| 6,553,568 B1 | 4/2003 | Fijolek et al. ............... 725/111 |
| 6,571,221 B1 | 5/2003 | Stewart et al. |
| 6,611,869 B1 | 8/2003 | Eschelbeck et al. ......... 709/228 |
| 6,615,347 B1 | 9/2003 | de Silva et al. |
| 7,171,411 B1 | 1/2007 | Lewis et al. |
| 7,412,719 B2 * | 8/2008 | Benantar et al. ............... 726/6 |
| 7,519,812 B2 | 4/2009 | Benantar et al. |
| 2002/0128981 A1 | 9/2002 | Kawan et al. |
| 2004/0068746 A1 | 4/2004 | Mori et al. |
| 2005/0081242 A1 | 4/2005 | Kwok |
| 2005/0160308 A1 | 7/2005 | Elcock et al. |
| 2009/0204810 A1 | 8/2009 | Benantar et al. |

OTHER PUBLICATIONS

Vasudevan, Venu, "A Web Services Primer," www.xml.com/pub/a/ws/2001/04/04/webservices/index.html, Apr. 2001.
Tech Encylopedia, "Web Services", 2004.
Rajaraman, Sriram, "What Web Services Are Not", Feb. 2002.
Webopedia.com, "Web services", Sep. 2003.
Tech Encylopedia, "Digital Certificate", 2004.
Kirtland, Mary, "A Platform for Web Services," www.msdn.microsoft.com, Jan. 2001.

* cited by examiner

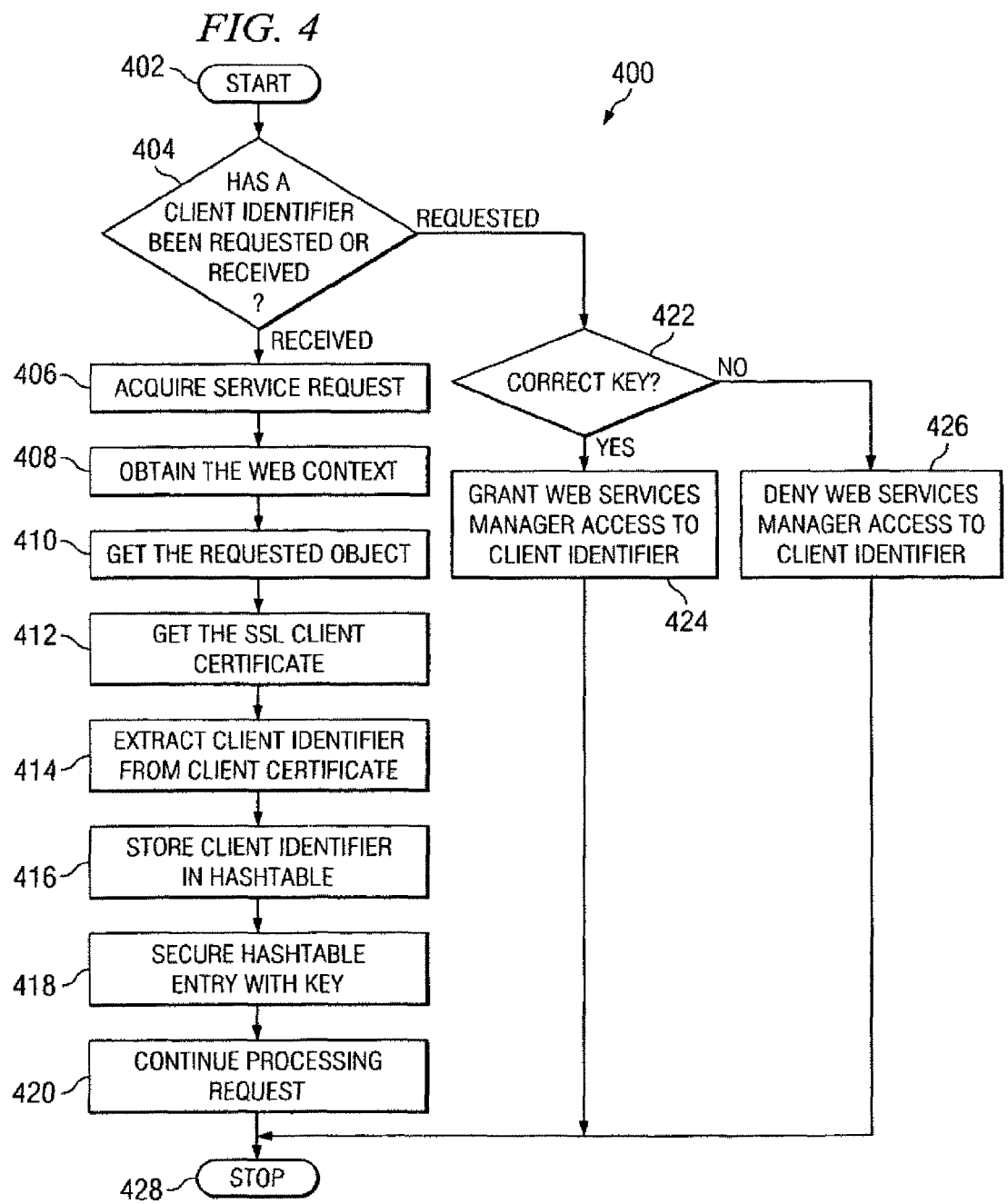

ARCHITECTURE AND DESIGN FOR CENTRAL AUTHENTICATION AND AUTHORIZATION IN AN ON-DEMAND UTILITY ENVIRONMENT USING A SECURED GLOBAL HASHTABLE

RELATED APPLICATIONS

This application is a continuation of U.S. patent application Ser. No. 10/850,398 filed May 20, 2004 now U.S. Pat. No. 7,412,719 and claims priority therefrom.

BACKGROUND OF THE INVENTION

The present invention relates in general to network security, and, in particular, to authentication and authorization for services delivered over a network.

For many years, network technology has enabled the sharing of, and remote access to, computing resources around the world. One computer can readily exchange data with a computer down the hall or in another country. Of course, it did not take long for the business world to harness the power of global networks, and network-technology has fueled the growth of an entire new industry focused on delivering services across these networks.

Commonly referred to as "web services," "application services," or "web service applications," network services typically expose existing business functionality over networks in a controlled environment and allow multiple, applications to interact with each other. Web service applications use standards such as Extensible Markup Language (XML), Simple Object Access Protocol (SOAP), and Hypertext Transfer Protocol (HTTP) that are widely available and accepted to facilitate interaction across networks. XML provides a language to tag data so that the various components of a web service application can understand the request. SOAP is a method of packaging data before transmitting it across a network. HTTP is a transport protocol that delivers data across the network. Web service applications usually run in the background and do not have a graphical user interface (GUI). Rather, web services interact via a service program interface (SPI). An SPI is defined strictly in terms of the messages that the web service accepts. Thus, a typical web service invocation consists of a first application (herein after referred to as the "service client") sending an XML message, which is packaged in a SOAP "envelope," across the network via HTTP to a second application (hereinafter referred to as the "service provider"). The format of the XML message, of course, must comply with the requirements of the service provider's SPI. Web service applications can perform a wide variety of functions, ranging from simple stock quote requests to complicated billing processes. A web service invocation has many common names, including a "service request," a "request call," or just a "call." For the sake of simplicity and clarity, any communication between a service client and a service provider for invoking a service will be referred to here as a "service request."

Generally, a business needs to control access to web services to maximize profit and to protect internal computing resources. In general, a business achieves control by requiring service requests to pass through a web service manager, which acts much like a firewall. A web service manager controls access on two levels: the service client level and the service agreement level. To gain access to the desired web service, a service client must first present credentials to the web service manager. The web service manager then must determine whether the credentials are authentic. If the credentials are authentic, the web service manager then determines whether the service client is entitled to receive the service that the service client requested. Finally, if the credentials are authentic and the service client is authorized to access the service provider, the web service manager authorizes the service provider to process the request.

Several methods of authentication are known in the art. The most conventional method requires each client to have a unique identifier (ID) and a password that only the client knows. Every time a client needs to access a service the client must present an ID and a password that the network service provider can match to the ID presented. Naturally, both the client and the network service provider must keep the password from being unduly disclosed or otherwise disseminated. Passwords must also be difficult to guess. To make passwords difficult to guess, many businesses implement complex security policies that require passwords to meet strict criteria and require clients to change passwords frequently.

Proprietary authentication methods, such as IBM's, WEB IDENTITY or TIVOLI ACCESS MANAGER, can also be used to control access to network services, but these methods are highly complex and require significant overhead.

Digital certificates are another alternative to the ID/password approach. Digital certificates are generally issued by a certification authority, which is typically a trusted third-party organization or company. Alternatively, digital certificates can be "self-signed." A self-signed certificate is created by the holder of the certificate, but is still useful if the parties to a transaction are already familiar with each other and the integrity of the certificate is initially verified manually. A digital certificate is usually encrypted, and usually contains a holder's name or identifier, a serial number, and expiration date. X.509 is the most common digital certificate format, and is the format recommended by the International Telecommunications Union. The holder's name or identifier; is commonly represented as a Distinguished Name, which is a part of the X.500 standard (also promulgated by ITU). A Distinguished Name is comprised of a combination of other X.500 identifiers, which may include: a Common Name, an Organizational Unit, Organization, and Country.

Digital certificates obviate the need for passwords and provide significant advantages over the use of IDs and passwords. An obvious advantage is that users do not have to conjure up or remember complicated passwords. Furthermore, digital certificates obviate the need to implement complicated security policies to ensure that passwords are difficult to guess, and they reduce the risk of security corn promise through lost or exposed passwords.

Although the art of using digital certificates is not new, integrating digital certificate technology into existing technologies, particularly web service applications, is extremely challenging. In particular, many existing web service applications have been designed to authenticate users based on an ID that is typically embedded in the service request. Thus, existing web service applications do not generally recognize IDs that are encoded in a digital certificate. Therefore, a need exists for an authentication mechanism that can be integrated with existing web services technology while reaping the benefits of digital certificate technology.

Another problem that has arisen in the web services context is the malicious access and searching of databases. Typically, a malicious party is able to breach a firewall using access codes and other information which they are not authorized to use. In some circumstances, the malicious party has limited access within the firewall and attempts to access data repositories that he is not authorized to access. Once inside the firewall, the malicious party can search databases, hashtables, and other data structures at will because there are no further security features on the data structures. Such unauthorized access is not preferable. Consequently, a need exists for a security feature that will prevent a malicious party from searching a data repository when the malicious party gains access past the firewall.

SUMMARY OF THE INVENTION

The invention described herein comprises a Centralized Authentication & Authorization system (CAA). The CAA facilitates secure communication between web service applications by maintaining an authorization database and providing authentication services to other web service applications.

CAA comprises a Service Request Filter (SRF), a Service Client Authentication Program, (SCAP), a Service Authorization Program (SAP), an Authorization Database (ADB), and a Security Program (SP). The SRF intercepts incoming service requests, extracts the service client's identifier from a digital certificate attached to the request, stores the identifier in, a secured hashtable that is accessible only by web service applications and forwards the service request on its original route. The SP controls access to the secured hashtable by encrypting the secured hashtable using a key. Typically, a web service manager will receive the original request and invoke the SCAP. The SCAP matches the identifier with an identifier stored in the ADB and validates the service client. The SAP then queries the ADB to determine if the service request is valid for the service client. If the service request is valid, the SAP authorizes the service request and the appropriate service provider processes the service request. The web service manager must present the correct key to the SP in order to access the client identifier and process the service request.

BRIEF DESCRIPTION OF DRAWINGS

The foregoing and other objects, features, and advantages of the invention will be apparent from the following more particular description of the preferred embodiment of the invention, as illustrated in the accompanying drawings wherein like reference numbers represent like parts of the invention, wherein:

FIG. 4 is an illustration of the logic of the Security Program (SP) of the present invention.

DETAILED DESCRIPTION OF THE PREFERRED EMBODIMENT

Figure 1:
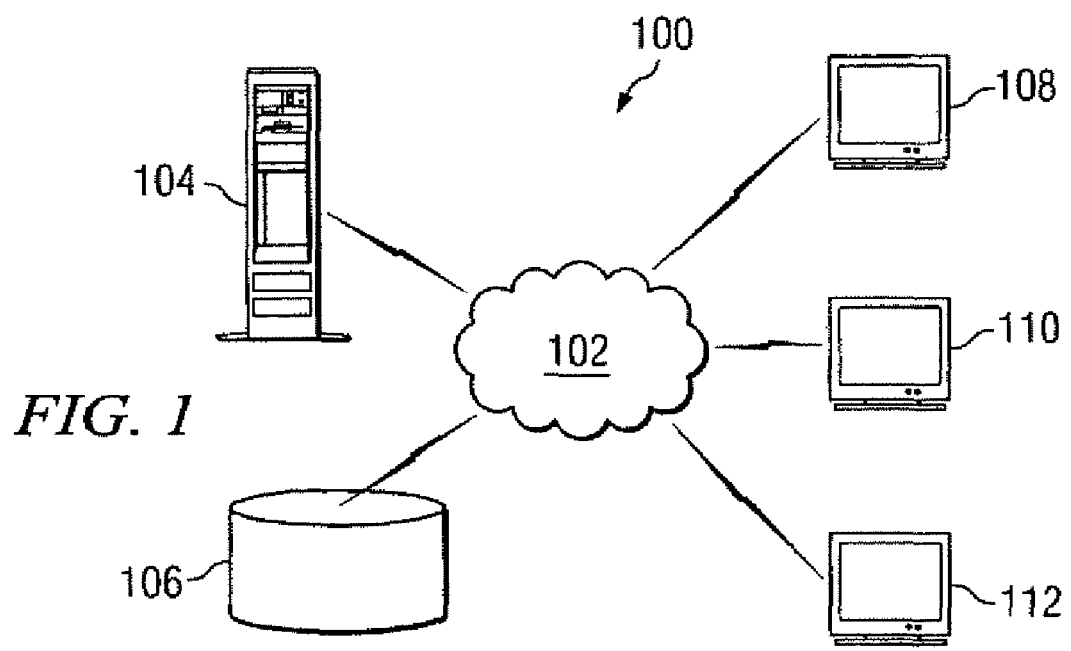
FIG. 1 is a depiction of a typical networked computing environment in which the integrated server architecture could be implemented.

As used herein, the term "application" shall mean any unit of executable machine instructions, including without limitation any software process, program, module, function, or routine.

As used herein, the term "authenticate" refers to the process of determining whether a digital certificate is valid.

As used herein, the term "authorize" refers to the process of determining whether a service client presenting an authentic digital certificate is entitled to access a particular web service application.

As used herein; the term "communication channel" shall mean any pathway over which data is, or may be, transferred between applications, including without limitation any physical or electromagnetic medium, such as a telephone line, optical fiber, coaxial cable or twisted pair wire, or radio wave.

As used herein, the term "database" shall mean any collection of data stored together and organized for rapid search and retrieval, including without limitation flat file databases, fielded databases, full-text databases, object-oriented databases, and relational databases.

As used herein, the term "service client" refers to any web service application that attempts to access a function or service of another web service application over a communication channel using a service program interface.

As used, herein, the term "service client identifier" shall mean any set of characters, numbers, marks, or other form of code that allows a service provider to distinguish one service client from another, or to establish the origin of a service request.

As used herein, the term "service program interface" shall mean a set of messages that a web: service application can accept and interpret.

As used herein, the term "service provider" refers to any web service application that can process a message sent on a communication channel through a service program interface and return output on a communication channel through a service program interface.

As used herein, the term "service request" shall mean any message sent from a service client on, a communication channel through a service program interface to a service provider.

As used herein, the term "web service application" shall mean any application, machine, or other device that is capable of processing messages from and returning output to other applications, machines, or devices.

As used herein, the term "web service architecture" shall mean a group of applications, machines, or other devices, or any combination thereof that permits a service client to send a service request on a communication channel to a service provider, and permits, a service provider to return a response to the service client on a communication channel.

As used herein, the term "web service manager" shall mean any application, machine, or other device that listens of a communication channel for incoming service requests, routes service requests to appropriate applications, accepts output from applications, and forwards the output on a communication channel.

The present invention can be implemented in many different configurations, including software, hardware, or any combination thereof. The CAA itself may be considered a web service application, but it may also be viewed as an integral, component of a web service architecture design. For the sake of clarity and simplicity, the invention is described as it would operate in conjunction with existing web service architecture.

FIG. 1 is an illustration of computer network 100 associated with the present invention. Computer network 100 comprises local workstation 108 electrically coupled to network connection 102. Local workstation 108 is electrically coupled to remote workstation 110 and remote workstation 112 via network connection 102. Local workstation 108 is also electrically coupled to server 104 and persistent storage 106 via network connection 102. Network connection 102 may be a simplified local area network (LAN) or may be a larger network such as a wide area network (WAN) or the Internet. Furthermore, computer network 100, depicted in FIG. 1 is intended as a representation of a possible operating network that may contain the present invention and is not meant as an architectural limitation.

Figure 2:
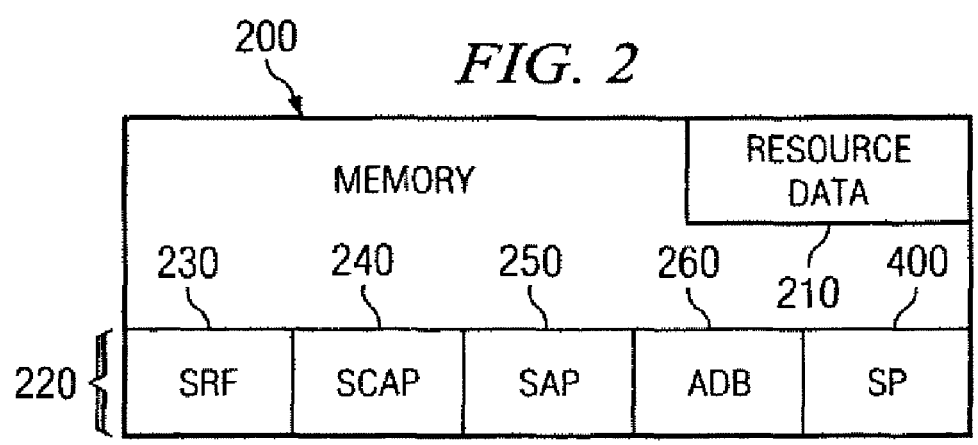
FIG. 2 represents the memory configuration of a typical computing workstation using the integrated server architecture.

The internal configuration of a computers including connection and orientation of the processor, memory, and input/output devices, is well known in the art. The present invention is a methodology that can be embodied in a computer program. Referring to FIG. 2, the methodology of the present invention is implemented in Centralized Authentication & Authorization: system (CAA) 220, which resides in memory 200. CAA 220 comprises Service Request Filter (SRF) 230, Service Client Authentication Program (SCAP) 240, Service Authorization Program (SAP) 250, Authorization Database (ADB) 260, and Security Program (SP) 400. CAA 220 described herein can be stored within memory 200 of any workstation or server depicted in FIG. 2. Alternatively, CAA 220 can be stored in an external storage device such as persistent storage 106, or a removable disk such as a CD-ROM (not pictured). Memory 200 is only illustrative of memory within one of the machines depicted in FIG. 2 and is not meant as a limitation. Memory 200 also contains resource data 210. The present invention may interface with resource data 210 through memory 200.

In alternative embodiments, CAA 220 and its components can be, stored in the memory of other computers. Storing CAA 220 in the memory of other computers allows the processor workload to be distributed across a plurality of processors instead of a single processor. Further configurations of CAA 220 across various multiple memories and processors are known by persons skilled in the art.

Figure 3:
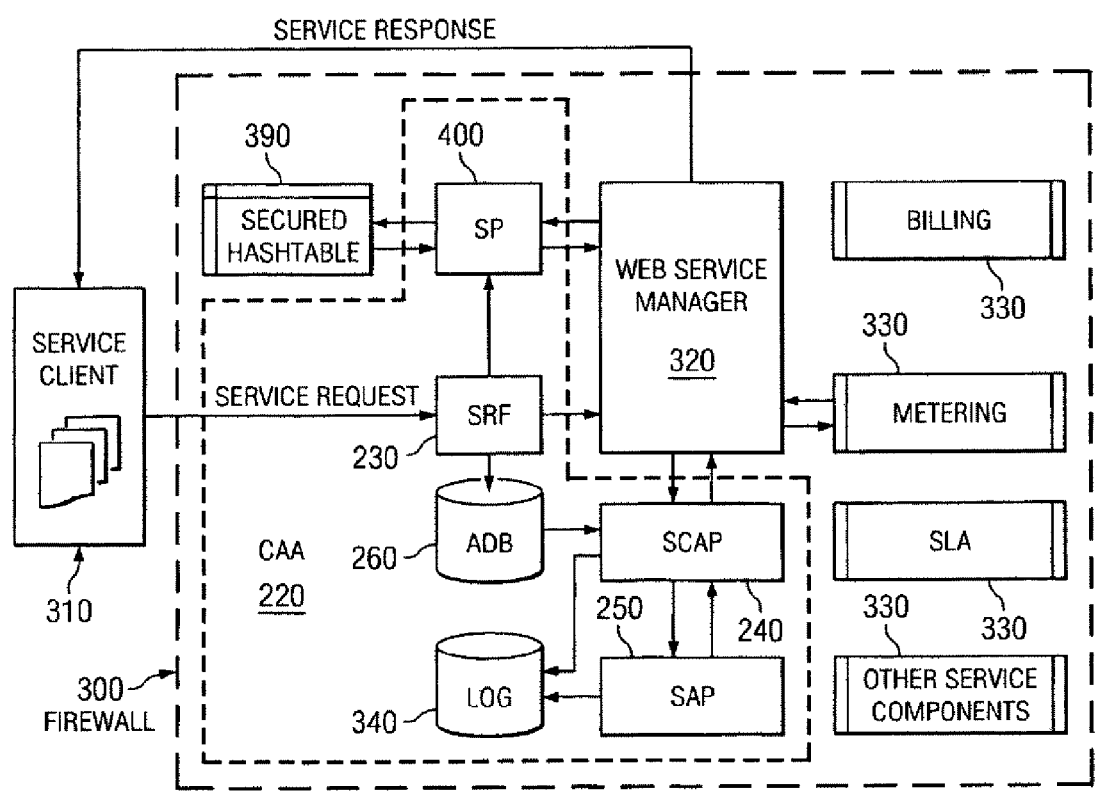
FIG. 3 is a depiction of the logical design of the present invention.

FIG. 3 provides an overview of the operation of the present invention when implemented with existing web service architecture 300. The operation is initiated when service client 310 sends a service request (e.g. for a metering log, service level agreement evaluation, etc.). The service request is accompanied by the service client's digital certificate. Service client 310 sends both the service request and the digital: certificate over a communication channel using a service program interface, such as simple object access protocol (SOAP). Without CAA 220, the service request typically would be received by the desired service provider or a web service manager listening on the communication channel. In the preferred embodiment of CAA 220, though, SRF 230 intercepts all service requests before they reach service provider 330 or web service manager 320. SRF 230 uses a Servlet Filter to intercept the Web Services rpc router service request. The Servlet filter-uses the Servlet 2.3 specification, which is part of the J2EE 1.3 specification, and is supported by websphere 5.x.

The rpc router sits on top of the HTTP Servlet transport. Once SRF 230 intercepts the service request, SRF 230 authenticates the service client's digital certificate with the issuing certification authority. If SRF 230: is unable to authenticate the digital certificate, SRF 230 refuses the request and notifies service client 310. If SRF 230 successfully authenticates the digital certificate with the certification authority, SRF 230 sends the service request to SP 400 for processing. The process of decrypting, validating, and extracting information from digital certificates is well known in the art. As explained in FIG. 4, SP 400 stores the client identifier in a JAVA security object, such as secured global hashtable 390. SP 400 controls access to secured hashtable using a key possessed only by web service manager 320 and other components authorized to access the JAVA security object. A person of skill in the art will appreciate that secured hashtable 390 may be another type of data structure, including a database, but security objects provide better performance and require less overhead than other data structures. The use of JAVA security objects also is well known in the art.

Returning to FIG. 3, after SRF 230 sends the service client identifier to SP 400, SRF 230 then forwards the service: request on the same communication channel. In the preferred embodiment, web service, manager 320 receives the request, and retrieves the service client identifier from SP 400. Web service manager 320 must send a key to SP 400 in order to access the identifier stored in secured hashtable 390. The key may be one of the keys used in public key encryption or digital-certificates. Persons of ordinary skill in the art are aware of other keys that may be used by SP 400 and web service manager 390. By using a key to verify that the web service manager 320 is in fact authorized to the secured hashtable, SP 400 prevents unauthorized access to secured hashtable 390 once service client 310 has gained access to the present invention by presenting the correct digital signature at SRF 230. Web service manager 320 then sends an authentication request to SCAP 240. SCAP 240 then attempts to match the service client identifier with a service client record in ADB 260. In the preferred embodiment, SCAP 240 records the service client identifier in authorization log 340. If SCAP 240 successfully matches the service client identifier with a service client record, SCAP 240 sends a request to SAP 250 to authorize the service request. In the preferred embodiment, SAP 250 records the service request in authorization log 340. If the service request is authorized (i.e. the service client has paid for or is otherwise entitled to the service), SAP 250 returns an authorization to web service manager 320, and web service manager 320 routes the request to service provider 330 to process the service request. Service provider 330 processes the request and returns the output to web service manager 320. Web service manager 320 formats the output and returns the output over the communication channel to service client 310.

FIG. 4 is an illustration of the logic of Security Program (SP) 400. SP 400 is a program that encrypts the client identifier in secured global hashtable 390 and verifies that web service manager 320 has authorization to access the client identifier. SP 400 starts (402) whenever a client identifier is requested or received. SP 400 then makes a determination whether a client identifier was requested or received (404). Client identifiers are generally received with a service request from service client 310. Client identifiers are generally requested by web service manager 320 or other components with authorization to access the client identifiers. If a client identifier was received, then SP 400 acquires the service request from SRF 230 (406). SP 400 then obtains the web content (408). SP 400 then gets the HTTP Servlet request object (410). SP 400 then gets the secure socket layer (SSL) client certificate from the request (412). The web.xml deployment descriptor for this action may look like:

```
<login-config id="LoginConfig__1060002337593">
    <auth-method>CLIENT-CERT</auth-method>
</login-config>
```

SP 400 then extracts the client identifier from the client certificate (414). The client identifier may be a distinguishing name from the client certificate or the entire client certificate. Persons of ordinary skill in the art will appreciate that the client identifier may be another data type. SP 400 stores the client identifier in global hashtable 390 (416). SP 400 secures the entry of the client identifier in secured hashtable 390 with, the key (418). SP 400 then instructs SRF 230 to continue prosecuting the request by sending the request on to the rpc router for normal processing (420) and ends (428).

If at step 404 SP 400 makes a determination that the client identifier has been requested, SP 400 makes a determination whether the request was accompanied by the correct key (422). In other words, CAA 220 authenticates aid authorizes the request from web services manager 320. If the request was accompanied by the correct key, SP 400 grants the web services manager 320 or other authorized components access to the client identifier associated with the key (424). In other words, only web services manager 320 or other authorized components can access the encrypted client identifier. If at step 410 the request was accompanied by the incorrect key, SP 400 denies web services manager or other unauthorized components access to the client identifier (426). SP 400 may also notify an administrator of the unauthorized access attempt and/or suspend access for a predetermined amount of time. SP 400 then ends (428).

A person of skill in the art will appreciate that various modifications and changes may be made in the preferred embodiment of the present invention without departing from its true spirit. The preceding description is for illustrative purposes only and should not be construed in a limiting sense. The scope of the invention should be limited only by the language of the following claims.

What is claimed is:

1. A programmable apparatus for authorizing a service request associated with a digital certificate to a web service application that does not recognize the digital certificate comprising:
    a processor;
    a memory connected to the processor;
    an authorization database in the memory;
    a service request filter program in the memory directing the processor to perform steps comprising:
        intercepting the service request associated with the digital certificate from a service client to the web service application;
        extracting a client identifier from the digital certificate;
        storing the client identifier in a secured data structure;
        encrypting the secured data structure using a key;
        forwarding the service request to a web service manager having the key;
        responsive to receiving an authorization request from the web service manager, the authorization request containing the key, using the key to retrieve the client identifier from the secured data structure;
        matching the client identifier with a service client record in an authorization log; and
        responsive to matching the client identifier with a service client record in the authorization log, sending an authorization for the service request to the web service manager;
    wherein, responsive to receiving the authorization for the service request, the web service manger sends the service request to the web service application.

2. A computer program product for causing a computer to authorize a service request associated with a digital certificate to a web service application that does not recognize the digital certificate, comprising:
    a computer-readable non-transitory storage medium;
    an authorization database stored in the storage medium;
    a service request filter program stored in the storage medium, wherein the storage medium, so configured by the service request filter program, causes the computer to perform steps comprising:
        intercepting the service request associated with the digital certificate from a service client to the web service application;
        extracting a client identifier from the digital certificate;
        storing the client identifier in a secured data structure;
        encrypting the secured data structure using a key;
        forwarding the service request to a web service manager having the key;
        responsive to receiving an authorization request from the web service manager, the authorization request containing the key, using the key to retrieve the client identifier from the secured data structure;
        matching the client identifier with a service client record in an authorization log; and
        responsive to matching the client identifier with a service client record in the authorization log, sending an authorization for the service request to the web service manager;
    wherein, responsive to receiving the authorization for the service request, the web service manger sends the service request to the web service application.

* * * * *